(12) United States Patent
Tatina

(10) Patent No.: US 7,182,560 B1
(45) Date of Patent: Feb. 27, 2007

(54) SWING UP BANDING ANCHOR SYSTEM AND METHOD

(75) Inventor: Richard A. Tatina, Countryside, IL (US)

(73) Assignee: Portec Rail Products Inc., Pittsburgh, PA (US)

( * ) Notice: Subject to any disclaimer, the term of this patent is extended or adjusted under 35 U.S.C. 154(b) by 167 days.

(21) Appl. No.: 10/960,452

(22) Filed: Oct. 7, 2004

(51) Int. Cl.
*B60P 7/08* (2006.01)

(52) U.S. Cl. .................. 410/106; 410/107; 410/97; 410/111; 410/23

(58) Field of Classification Search ............ 410/34–36, 410/42, 23, 9–11, 19, 97, 100, 101, 102, 106–107, 410/109–112, 116; 248/499; 24/265 CD, 24/115 K, 115 L, 129 D
See application file for complete search history.

(56) References Cited

U.S. PATENT DOCUMENTS 4,475,854 A * 10/1984 Ericsson ............... 410/103
6,974,288 B2 * 12/2005 Tatina ................... 410/106

* cited by examiner

*Primary Examiner*—Stephen Gordon
(74) *Attorney, Agent, or Firm*—Schiff Hardin LLP

(57) ABSTRACT

A swing up post is provided for attachment to a banding anchor used for securing a load-retaining band on a deck. At least one ear is provided having a respective aperture for receiving a bolt used to rotatably secure the at least one ear to a support surface associated with the deck. A retaining portion is connected to the at least one ear to retain the banding anchor. An end plate is provided at the end of the retaining portion which retains the banding anchor on the retaining portion. In a load retaining position, the swing up post is in a swung up position and in a storage position the swing up post is in a hung down position.

13 Claims, 3 Drawing Sheets

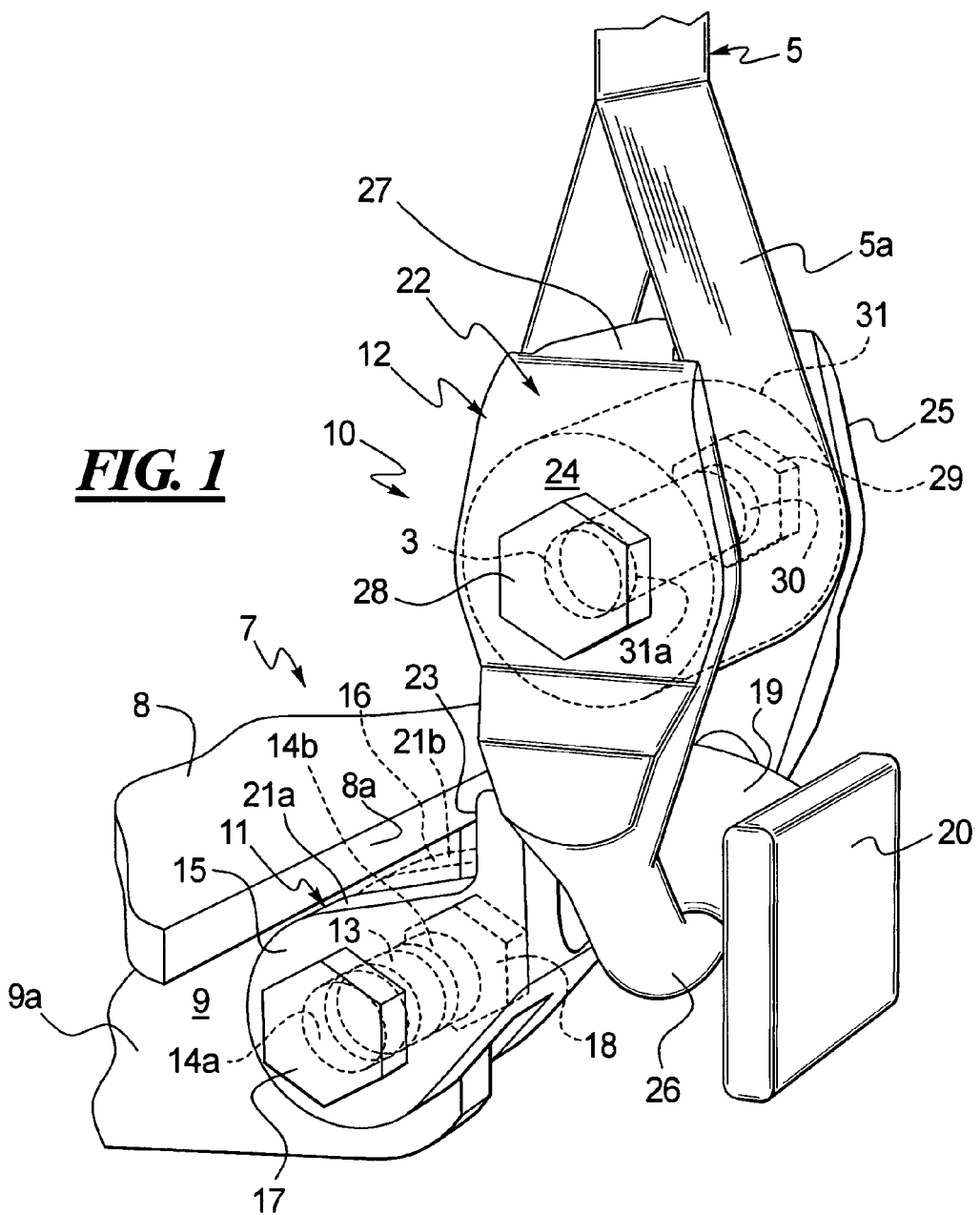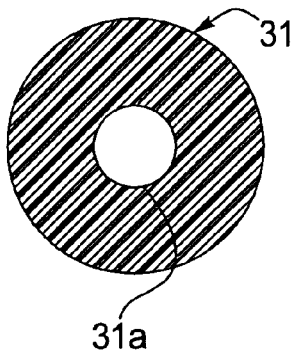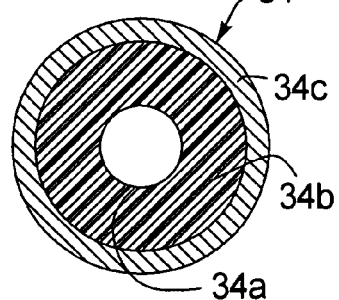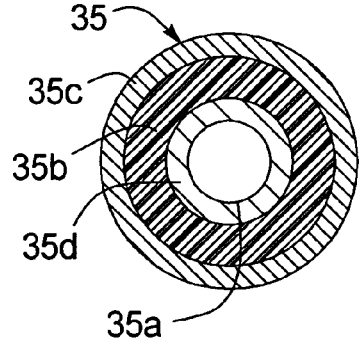

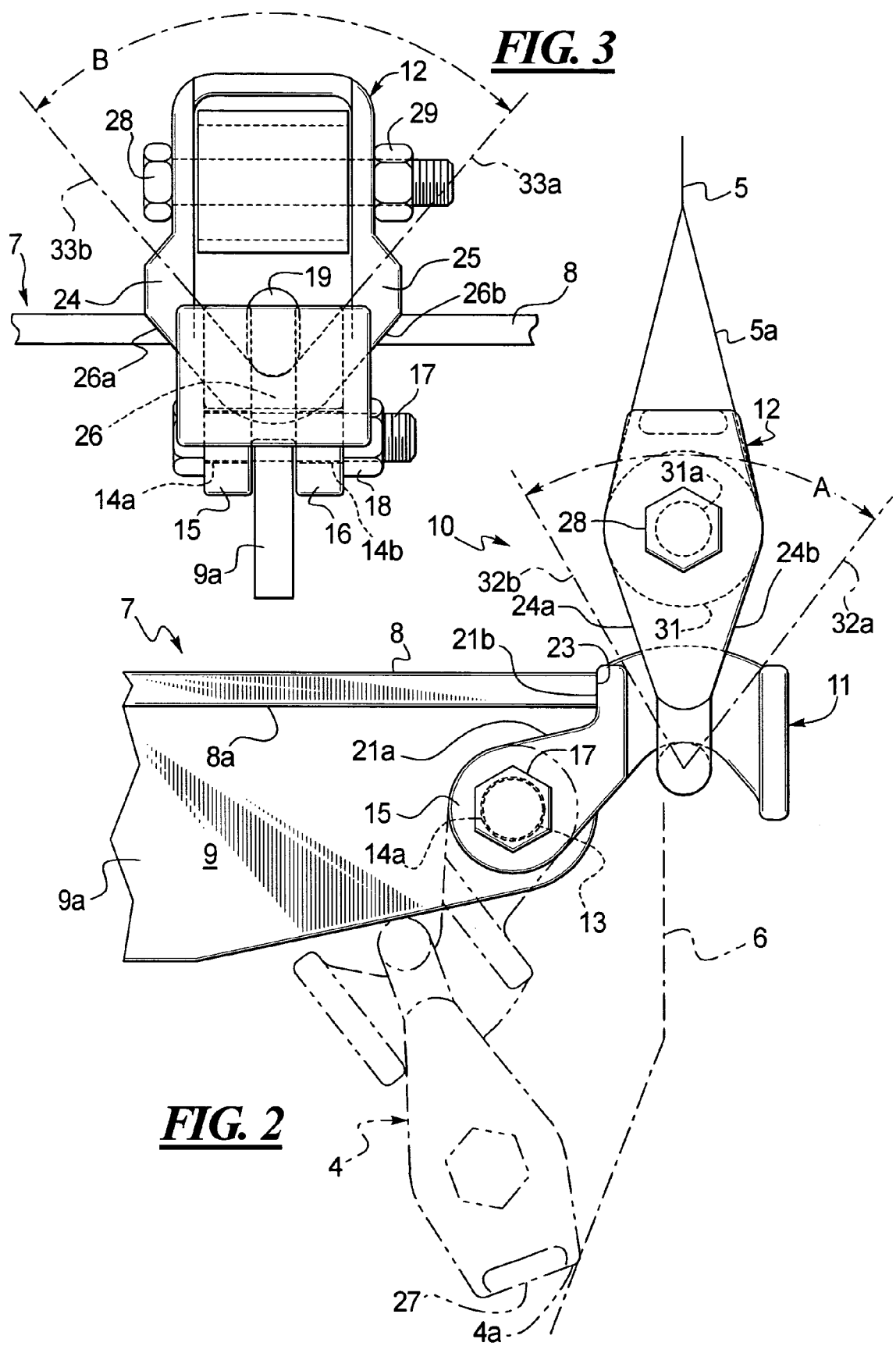

SWING UP BANDING ANCHOR SYSTEM AND METHOD

RELATED APPLICATION

This application is related to U.S. Pat. No. 6,974,288 entitled "Cushioned Banding Anchor" issued Dec. 13, 2005, of the same inventor.

BACKGROUND

Railroad flat cars and flat bed trucks are known for transporting vehicles, large and small diameter pipe, containers, lumber, truck frames, etc. These items being transported, hereinafter referred to generically as the load, must be secured to the flat deck or bed.

In the prior art the load may be secured to the flat rail car deck by steel bands which have end loops that wrap around a roller attached within an interior opening of a banding anchor body of a banding anchor. The banding anchor is attached to the side of the rail flat car by a U-shaped retainer typically welded to a sidewall or side-skirt of the flat car. In order to provide clearance for the banding, a cutout is typically made in the deck adjacent where the anchor banding attaches to the sidewall. Since many banding anchors may be employed with corresponding steel bands, a large number of cutouts reduce the useable deck area and create cutout edges, which could cause damage to rubber tires or other portions of the load. Cost is also added to the car construction.

SUMMARY

It is an object to provide a banding anchor system which does not reduce the useable deck area, which does not protrude from a side of the rail car or other type of load carrier such as a flatbed truck or the like, and which reduces cost.

A swing up post is provided for attachment to a banding anchor used for securing a load-retaining band on a deck. At least one ear is provided having a respective aperture for receiving a bolt used to rotatably secure the at least one ear to a support surface associated with the deck. A retaining portion is connected to the at least one ear to retain the anchor body. An end plate is provided at the end of the retaining portion, which retains the anchor body on the retaining portion. In a load retaining position the swing up post is in a swung up position, and when not in use, it hangs down from the securing bolt.

BRIEF DESCRIPTION OF THE DRAWINGS

FIG. 1 is a perspective view of a swing up banding anchor system installed at a loading deck;

FIG. 2 is an end view of the system of FIG. 1;

FIG. 3 is a side view of the system of FIG. 1;

FIGS. 6A–C are cross-sectional views of the roller cylinder showing three different embodiments thereof.

DESCRIPTION OF THE PREFERRED EMBODIMENT

Figure 4:
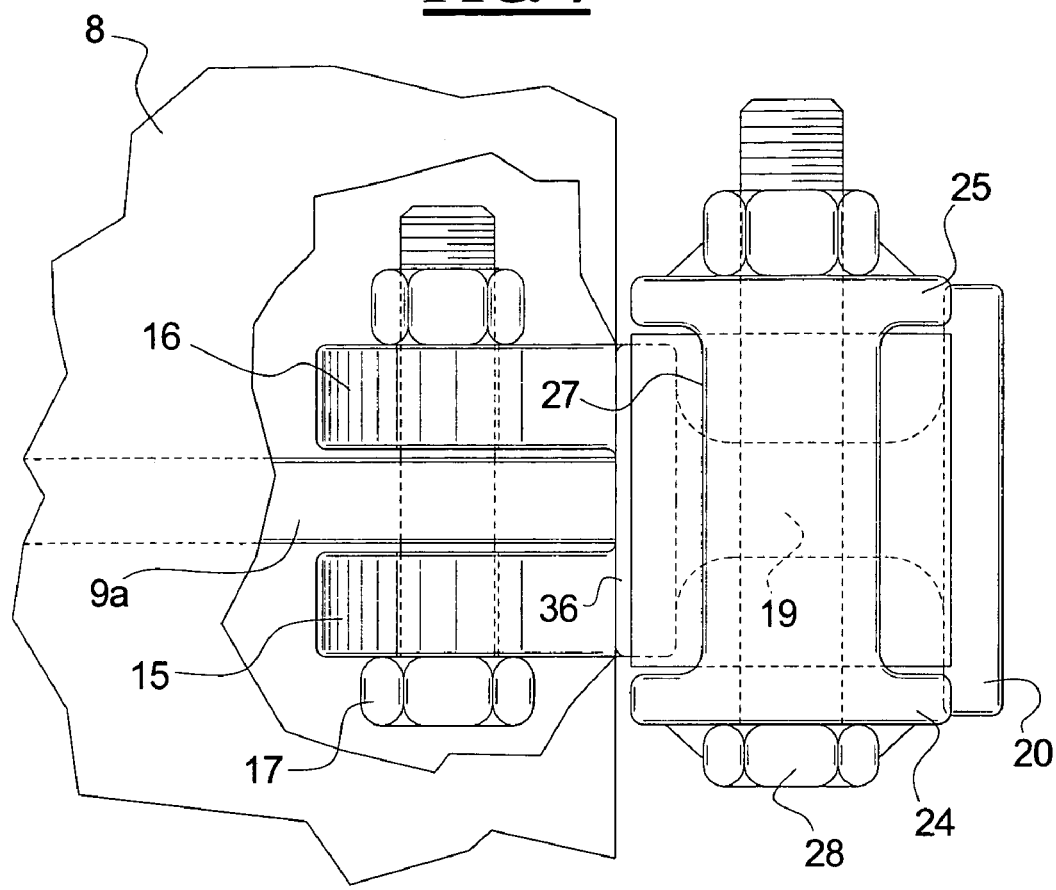
FIG. 4 is a top view of the system of FIG. 1.

For the purposes of promoting an understanding of the principles of the invention, reference will now be made to preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

The swing up banding anchor system is generally shown at 10 in the perspective view in FIG. 1. The system comprises a swing up post 11 connected to a banding anchor 12. The banding anchor 12 attaches to a load-retaining band 5 having a loop 5a. The band 5 secures a load to a deck 8 of, for example, a rail car 7. The deck 8, of course, could also be a deck of other load-conveying vehicles, such as a flatbed truck or trailer.

The deck 8 is supported by a support 9 having a support gusset 9a supporting an overhang portion 8a of the deck 8.

The support gusset 9a forms a vertical wall having a hole 13 aligned with apertures 14a and 14b of respective ears 15 and 16 of the swing up post 11. A bolt 17 attaches the swing up post 11 in swingable fashion to the hole 13 of the vertical wall 9a. The bolt is held in place by a nut 18 such as a lock nut or a nut, which is tack-welded to the bolt.

Figure 5:
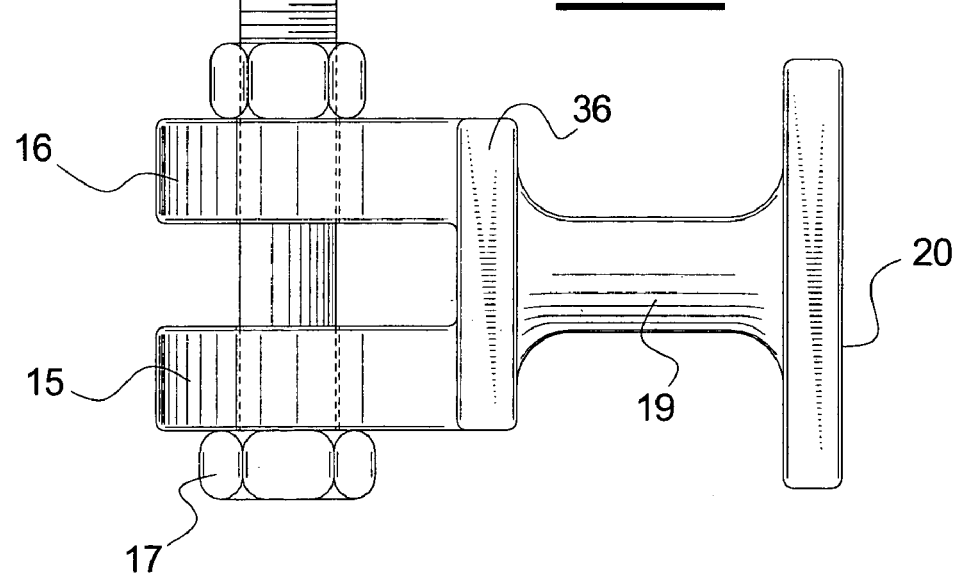
FIG. 5 is a top view of FIG. 4, but with the banding anchor removed for a clear view of the swing up post of the system.

The swing up post 11 having the support ears 15 and 16 has a base portion 36 (see FIG. 5) connected to a curved retaining portion 19 connected to an end plate 20.

As shown most clearly in FIG. 2, when the swing up post 11 is in the load retaining upward position shown in FIG. 2, the end 23 of the deck 8 abuts against a vertical side portion 21b of the swing up post 11, which merges into top surface 21a of the ear 15. Similar surfaces are provided on the ear 16.

The banding anchor 12 comprises a banding anchor body 22. The banding anchor body 22 comprises a top connecting portion 27, and sidewalls 24 and 25 merging at the bottom into a V-shaped loop portion 26 engaging the aforementioned curved retainer portion 19 of the swing up post 11.

A bolt 28 received through respective apertures 3 and 30 in the sidewalls 24 and 25 retains an elastomeric roller cylinder 31. A nut 29, which may be a lock nut, is received on bolt 28. The loop 5a of the band 5 wraps around the roller cylinder 31. The roller cylinder 31 may have different embodiments as shown in FIGS. 6A–C, such as a polyurethane cylinder 31 with aperture 31a (FIG. 6A), an outer steel tube 34c with an inner elastomeric cylinder insert 34b with aperture 34a (cylinder 34 of FIG. 6B), or an outer steel tube 35c, an inner elastomeric insert 35b, and an inner steel tube 35d with aperture 35a (cylinder 35 of FIG. 6C). Other designs are also possible for the attachment cylinder 31. However, in the different embodiments of the attachment cylinder 31, an inner aperture 31a, 34a, or 35a is provided receiving the bolt 28. Preferably the attachment cylinder freely rotates about the bolt 28.

As shown by dashed lines 32a, 32b in FIG. 2 in the end view, the anchor body is free to swing towards or away from the deck 8 by an overall angle A defined by dashed lines 32a, 32b which in one preferred embodiment can be approximately 26°. This swingability is permitted in view of the slant cut bottom edges 24a, 24b, of sidewall 24. Similar slant cut bottom edges are provided on sidewall 25.

This swingability allows the banding anchor to freely adjust to the different path directions taken by band 5 depending upon the load positioning, size, and securement on the deck 8.

As shown in the side view of FIG. 3, the banding anchor 12 is also free to swing by an angle B with the V-shaped loop portion 26 defined by legs 26a and 26b rotating about the curved retainer portion 19. The angle B may be approximately 80°, for example. Thus, if the load shifts during transport so that the banding anchor is aligned at a forward angle or a rearward angle, this is compensated for by the swing clearance of the anchor body in the motion direction of the rail car 7, that is the longitudinal extent of the deck 8.

As shown most clearly in FIG. 2, when the anchor body is not in use, it is in a swung down position as shown at 4 by dashed lines in which it hangs down from the bolt 17. In this configuration, as shown at 4a, the corner of the anchor body at the top portion 27 lies interiorly of an American Association of Railroads clearance standard profile 6 shown with dashed lines.

Thus the swing up banding anchor system allows a banding to be used for securing a load or a deck without requiring cutouts in the deck or obstructing the deck. Also a swinging movement is permitted for the banding anchor both toward and away from the load and in a load shifting direction in a direction of travel of the deck 8 on the car 7, which is the longitudinal direction of the rail or truck flatbed or deck 8. Also, the swing up banding anchor system in its stored position is stored out of the way and within the American Association of Railroads clearance requirements. Finally, the system is easy to install.

Preferably, the anchor body and the swing up post are cast elements although other methods of construction may be employed, including separate piece elements for the swing up post and/or the anchor body. Steel is preferably used as a construction material, although other materials such as plastic or other strong materials may be employed.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim:

1. A swing up post for attachment to a banding anchor used for securing a load on a deck with a load retaining band, comprising:
   a support surface mounting end and a banding anchor retaining end opposite the support surface mounting end;
   said support surface mounting end comprising first and second ears having respective apertures for receiving a support surface bolt used to rotatably secure the ears to a support surface below a top surface of the deck;
   a base portion connecting the ears; and
   said banding anchor retaining end comprising a banding anchor retaining portion connected to the base portion and used to loosely retain the banding anchor and an end plate at an end of the retaining portion for loosely retaining the banding anchor on the retaining portion.

2. A swing up post of claim 1 wherein the base portion has a stop surface for abutting the deck when the swing up post is in a load retaining swung up position.

3. A swing up post of claim 2 wherein said stop surface comprises a vertical side portion of the base portion which abuts against an end of the deck when said swing up post is in said load retaining swung up position.

4. A swing up post of claim 1 wherein in a swung down storage position when the banding anchor is not secured to the load retaining band, the post hangs downwardly from the bolt used to secure the swing up post to the support surface.

5. A swing up post of claim 1 wherein the deck comprises a rail car deck and the support surface is beneath the rail car deck.

6. A swing up post of claim 1 wherein the support surface comprises a vertical gusset beneath an overhang portion of the deck.

7. A swing up post of claim 1 wherein a nut is provided on an end of said bolt, the nut being tack welded in place.

8. A swing up post of claim 1 wherein the swing up post comprises a one piece metal casting.

9. A swing up post of claim 1 wherein the end plate is rectangular.

10. A swing up post of claim 1 wherein the retaining portion curves upwardly when the post is in a load retaining swung up position.

11. A swing up post of claim 1 wherein the retaining portion is shaped to permit said banding anchor to assume various upward angular positions to compensate both for load shift in a longitudinal direction of the deck corresponding to a traveling direction and also in a direction toward and away from said deck.

12. A swing up post of claim 1 wherein said retaining portion is shaped to pass through an interior opening of the banding anchor.

13. A swing up post of claim 1 wherein the first and second ears are parallel and spaced apart from each other and form a slot which receives a vertical portion of said support surface.

* * * * *